Dec. 16, 1941.  C. N. BEBINGER  2,266,300
BEARING SHIELD
Filed Aug. 7, 1941
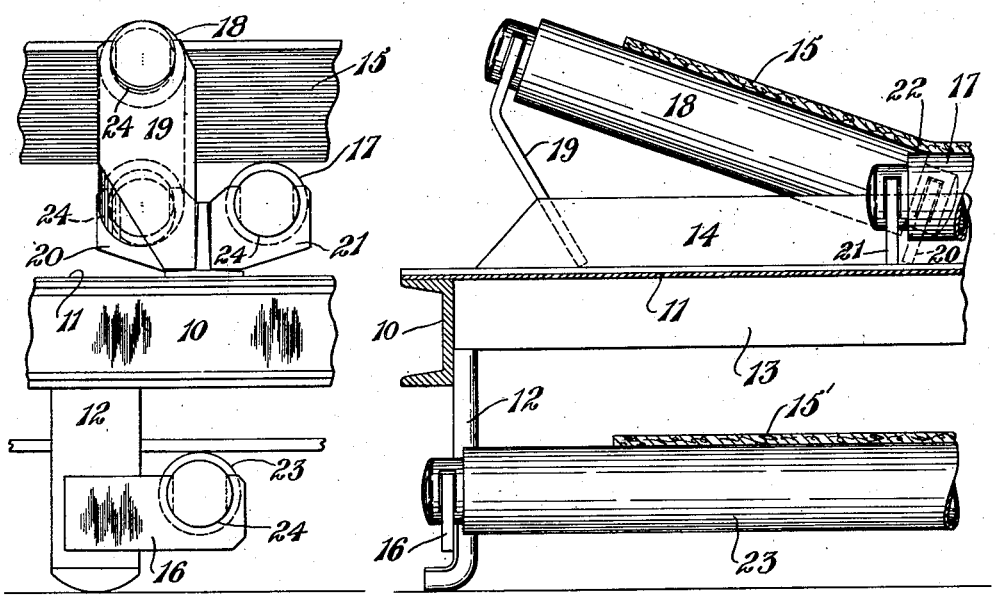
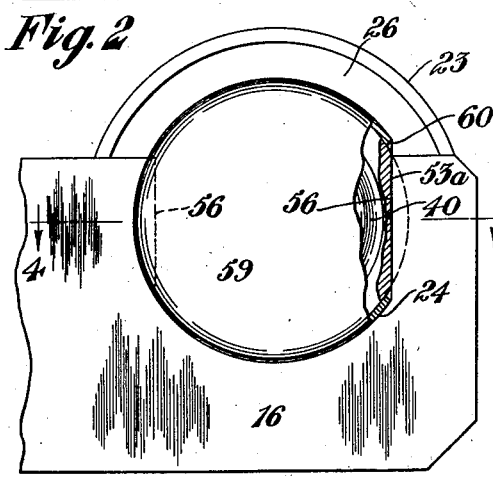
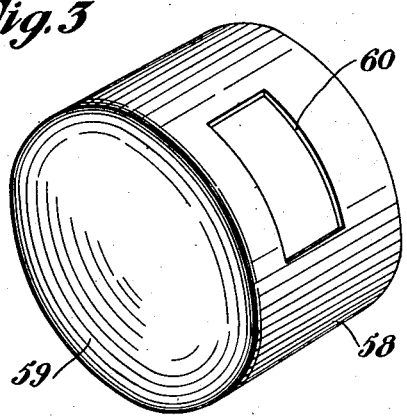
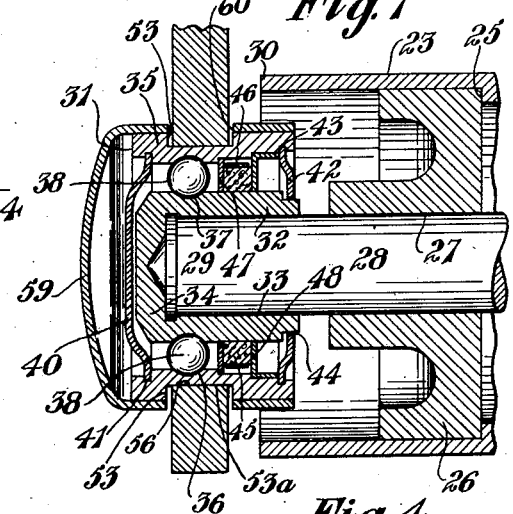
Inventor
Charles N. Bebinger
By Frease and Bishop
Attorneys Patented Dec. 16, 1941

2,266,300

UNITED STATES PATENT OFFICE 2,266,300

BEARING SHIELD

Charles N. Bebinger, New Philadelphia, Ohio, assignor to La-Del Conveyor & Manufacturing Company, New Philadelphia, Ohio, a corporation of Ohio Application August 7, 1941, Serial No. 405,806

8 Claims. (Cl. 308—20)

The invention relates to a self contained anti-friction bearing for use on the end of a shaft, and having its outer race grooved for detachably mounting the bearing in a U-shaped bracket, and more particularly the invention relates to a novel shield for protecting and cushioning the bearing.

Self contained anti-friction bearings are used in great numbers to mount the shaft ends of idler rollers supporting belts carrying material, for example, belts conveying coal in mines, where a single run of the belt may be so long as to require many thousand bearings. These bearings must not only be effectively sealed to exclude dust, but must be extremely rugged to withstand shocks from rough handling, heavy loads and falling material.

Obviously, these belt idler bearings should be quickly replaceable without special tools, and practical experience has proven that the most satisfactory all around solution to this requirement is to secure the inner race of the bearing on the end of the roller shaft, and provide flat bottom grooves on the outer race for detachably and non-rotatively fitting the U-shaped notch of a supporting bracket.

The outer races of anti-friction bearings are substantially universally made of alloy steel heat treated to a high degree of hardness for resisting the wear of the anti-friction elements, and such races are consequently brittle and susceptible to breakage under heavy shocks. Moreover, the outer end of a self contained belt idler bearing is closed usually by a separate sheet metal end piece, which is distorted and knocked out by either shocks or impacts, so that even if the outer race is not broken the bearing may be seriously damaged or completely destroyed.

It is therefore an object of the present invention to provide an improved self contained belt idler bearing adapted for detachable mounting in a U-shaped bracket and having means for cushioning and protecting said bearing.

Another object is to provide a novel shield for a self contained bearing, which shield protects the outer end of the bearing from damage and cushions the outer race from shocks.

Another object is to provide a novel shield for a self contained belt idler bearing having bracket grooves in its outer race, which shield protects the bearing without interfering with the action of said grooves.

A further object is to provide a novel shield which is adapted for easy application to self contained bearings already in use, without changing the construction of the bearing or the shield or the bearing bracket.

Another object is to provide a novel shield for a self contained bearing, which shield not only protects the bearing from shock but serves as an additional dust and grease seal.

A still further object is to provide a simple and inexpensive shield for a self contained bearing, which shield is easily applied to and removed from said bearing, and which is adapted to be automatically locked on the bearing when the bearing is seated in a supporting bracket.

These and other objects are accomplished by the novel parts, improvements, and combinations comprising the present invention, which may be described in general terms as including a self contained bearing having an inner race for attachment on the end of an idler shaft, an outer race having exterior grooves for detachable non-rotative mounting in a U-shaped bracket notch, and a cup-shaped shield of thin resilient metal fitting over the outer race and provided with slots registering with said grooves in the outer race.

In the drawing forming part hereof

Figure 1 is a fragmentary sectional view of a belt conveyor, showing the improved self contained bearings with their shields, applied to the idler rollers supporting the belt;

Fig. 2 is a fragmentary side elevation thereof;

Fig. 3 is an enlarged elevation looking toward the end of one of the idler rollers and showing a portion of the supporting bracket therefor;

Fig. 4 is a fragmentary plan sectional view thereof as on line 4—4, Fig. 3; and

Fig. 5 is a detached isometric view of the novel bearing shield.

Similar numerals refer to similar parts throughout the several views of the drawing.

The belt conveyor shown in Figs. 1 and 2 includes a supporting frame having a longitudinal channel 10 at each side thereof, and a cover plate 11 secured to the tops of the channels. Preferably, upright leg members 12 are secured to the inside of each channel 10 at longitudinal intervals for supporting the channels and cover plate at a desired distance above the ground or floor.

Transverse frame members 13 may be provided between the channels 10 at longitudinal intervals for bracing the channels and supporting the cover plate 11, and transverse mounting bars 14 may be provided for supporting the idler rollers which carry the upper run 15 of the conveyor belt. The idler rollers carrying the return run 15' of the conveyor belt are preferably mounted in brackets 16 secured to the legs 12 as by welding.

In the conveyor shown in Figs. 1 and 2, the upper run 15 of the belt is rollably supported at intervals in a trough shape by central horizontal rollers 17 and inclined rollers 18 at each side thereof, with the ends of the inclined rollers 18 overlapping the horizontal roller 17. Only one of the inclined rollers 18 and one side of the conveyor is shown in the drawing, the other roller 18 and the other side of the conveyor being identical therewith.

An angular bracket 19 is provided for supporting the outer and upper ends of each roller 18, and is secured at its lower end to the transverse bar 14, as by welding. Brackets 20 are secured to the transverse bar 14 at the inner ends of the rollers 18, and brackets 21 are secured to the other side of the transverse bar 14 at each end of the horizontal roller 17 for supporting the same.

The brackets 20 and 21 are positioned so as to provide a slight amount of overlap between the ends of the rollers 17 and 18, as indicated at 22 in Fig. 1, and each of the brackets 19, 20 and 21, together with brackets 16 which carry the return belt roller 23, is provided with a U-shaped bearing notch 24, which notches are of the same size and shape.

The general construction and arrangement of the belt conveyor and idle rollers shown in Figs. 1 and 2 is more or less conventional, and per se forms no part of the present invention.

The construction and mounting of the self contained anti-friction bearings and the novel shields therefor, is identical for each of the bearings at the ends of the several idler rollers 17, 18 and 23, and accordingly the construction and mounting of the bearing and shield at one end of the idler roller 23 is shown in Figs. 3, 4 and 5 as illustrative of all of the bearings.

The idler roller 23 is preferably tubular and has an annular shoulder 25 formed in each end thereof, and a closure member 26 is secured in each end of the idler roller in abutment with shoulder 25, each closure member 26 having an axial bore 27 in which the idler shaft 28 is non-rotatively secured. The end portion 29 of the idler shaft 28 projects outwardly beyond the end 30 of the idler roller 23 and the self contained anti-friction bearing unit indicated generally at 31 is detachably secured on the end portion 29 of the shaft.

The inner race 32 of the bearing unit 31 is preferably cup-shaped, having a bore 33 with its outer end closed by an end wall 34, and the end portion 29 of the shaft has a press fit in the bore 33, so that the inner race 32 is detachably and non-rotatively mounted on the shaft.

The outer race 35 of the bearing 31 is preferably substantially longitudinally coextensive with the inner race 32, and is provided with a race groove 36 radially opposite to a race groove 37 in the inner race for rollably mounting anti-friction elements shown as the balls 38.

Means providing a dust and grease seal at the outer end of the bearing 31 preferably includes a sheet metal closure plate 40 detachably engaged in a groove 41 in the outer race 35 with a snap fit and covering the end wall 34 of the inner race. A labyrinth seal is preferably provided between the inner and outer races at the inner end of the bearing, and includes an annular sealing ring 42 engaged at its outer edge in a groove 43 in the outer race with its inner edge having a close working clearance at the inner race as shown at 44. An annular cork gasket 45 is preferably provided between the balls 38 and the ring 42, and is held to a close sliding fit on the inner race by means of an annular spring 46. The labyrinth seal preferably includes a sealing ring 47 engaging the cork gasket at the side adjacent to the balls 38 and secured to the outer race at its outer edge, and a flanged sealing ring 48 engaging the other side of the cork gasket and secured at its outer edge to the outer race.

The annular space between the races and enclosed by the sealing rings 42 and 48 is filled with a fibrous packing grease for absorbing foreign material, and the annular space between the closure 40 and the ring 47 is filled with a light lubricating grease for lubricating the balls and the races.

Thus the bearing 31 is a self contained unit which may be detached quickly and easily from the end of shaft 28 for replacement or storage, and the bearing is effectively sealed against moisture, acids or foreign material, whether attached to or detached from the shaft.

In order to support the idler rollers in the bearing brackets so that the rollers may be quickly mounted and detached without the use of special tools, the bearings 31 are non-rotatively mounted in U-shaped notches 24 in the bearing brackets. As shown in Figs. 3 and 4 the outer race 35 of the bearing is preferably provided at diametrically opposite locations with external grooves 53, and the bottom of each groove is preferably a flat surface as shown at 53a. The grooves 53 are located on the outer race 35 in such position that when the bearing is assembled on the end portion 29 of shaft 28, the grooves will be located beyond the end 30 of the idler roller 23.

The side walls 56 of the bearing notch 24 in the bearing brackets are flat and adapted to engage the bottom surfaces 53a of the grooves 53 when the bearings 31 positioned on the shaft 28 are dropped in the bearing notches, for non-rotatively mounting the bearings in the notches. When the idler rollers are thus mounted in the bearing notches, the inner race 32, shaft 28 and roller 23 all rotate as a unit with the balls 38 rolling in the race grooves and the outer race 35 being held in the bearing notch. Thus any individual roller with its bearings can be quickly lifted out of the bearing notches mounting the same without the use of tools or without moving the supporting brackets, and the bearings 31 can then be easily detached and new bearings 31 replaced on the idler shaft 28.

The improved bearing shield shown detached in Fig. 5 is cup-shaped having a cylindrical side wall 58 and a dome shaped end wall 59. The shield is made of relatively thin resilient material, and is preferably a relatively soft or mild steel which has substantial resiliency and is not susceptible to cracking or breaking.

The cylindrical side wall 58 of the shield is made of a size which will fit over and around the outer race 35 of the bearing 31 and may be applied with a light tapping fit. As shown in Fig. 4 the length of the side wall is such as to be substantially coextensive with the outer race 35 and the dome shaped end wall 59 is formed to be spaced from the bearing 31 when the shield is applied.

As shown in the drawing the cylindrical side wall 58 of the bearing shield is provided with slots 60 located at diametrically opposite positions and adapted, when the shield is applied, to register exactly with the grooves 53 in the outer race.

Thus the shield does not interfere in any way with the detachable non-rotative mounting of the bearings 31 in the bearing notches.

The novel and improved bearing shield provides means for protecting the outer race of the bearing and cushioning the bearing from shocks due to rough handling, heavy loads and falling material. In addition, the dome shaped end wall of the shield being spaced from the bearing proper provides a resilient protecting wall which is especially effective in protecting and cushioning the bearing from end shocks, and in preventing deformation of the dome shaped end wall from being transmitted to the bearing. This dome shaped end wall not only provides an additional protection against damage to the end of the bearing, but also provides an additional dust and grease tight seal for the bearing.

The fact that when the bearings are removed from the bearing notches, the shield is easily removed from the bearing, makes possible the elimination of the end closure plate 40 if desired, and permits easy cleaning, inspection and lubrication of the bearing.

Due to the fact that the shield extends over the whole cylindrical length of the bearing as well as its outer end, a much greater area of enclosure and a more effective enclosure is provided than would be possible with any separate end closure piece, and the slots 60 not only permit engaging the grooves 53 of the bearing with the bearing notches but automatically lock the shields in position when the bearings are engaged in the notches.

The novel improved bearing shield is adapted for application to self contained bearing units such as 31 which are already in use without requiring any changes to the shield or to the bearing or the bearing notches, and the light tapping fit of the shield with the bearing provides a non-uniform contact between the outer race and the shield, that is, contact at various points, and this increases the cushioning effect of the shield. When the bearings are seated in the bearing notches, the shield acts to cushion thrust shocks on the supporting bracket because of the contact between the supporting bracket and the slotted portions of the shield.

The novel and improved bearing shield is simple and inexpensive to construct, and is easily applied to or removed from conventional self contained anti-friction bearings having exterior bracket grooves, without the use of special tools.

I claim:

1. Bearing construction including an inner race adapted for attachment to the end of an idler shaft, an outer race having exterior flat bottom grooves for engaging a U-shaped bracket, and a cup-shaped shield enclosing said bearing and having slots registering with said grooves.

2. Bearing construction including an inner race adapted for attachment to the end of an idler shaft, an outer race having exterior flat bottom grooves for engaging a U-shaped bracket, and a cup-shaped shield of thin resilient material detachably enclosing said bearing and having slots registering with said grooves.

3. Belt idler bearing structure including a roller shaft, an inner race secured on the end thereof, an outer race having exterior flat bottom grooves, a cup-shaped shield enclosing said bearing and having slots registering with said grooves, and a U-shaped bracket engaging said grooves and located in said slots for locking said shield in position.

4. Belt idler bearing structure including a roller shaft, an inner race secured on the end thereof, an outer race having exterior flat bottom grooves, a cup-shaped shield of thin resilient material detachably enclosing said bearing and having slots registering with said grooves, and a U-shaped bracket engaging said grooves and located in said slots for locking said shield in position.

5. Bearing construction including a self contained bearing having an inner race for attachment to the end of a shaft, an outer race provided with exterior grooves for non-rotatively engaging a U-shaped bracket, and a cup-shaped shield detachably enclosing said bearing and having a dome-shaped end wall spaced from the end of said bearing, the side wall of said shield having slots registering with said grooves in the outer race.

6. Bearing construction including a self contained bearing having an inner race for attachment to the end of a shaft, an outer race provided with exterior grooves for non-rotatively engaging a U-shaped bracket, and a cup-shaped shield of thin resilient material detachably enclosing said bearing and having a dome-shaped end wall spaced from the end of said bearing, the side wall of said shield having slots registering with said grooves in the outer race.

7. In a self contained anti-friction bearing having diametrically opposite bracket grooves on the exterior of its outer race, a cup-shaped shield of thin resilient material enclosing the bearing and having slots registering with said bracket grooves.

8. In a self contained anti-friction bearing having diametrically opposite bracket grooves on the exterior of its outer race, a cup-shaped shield of thin resilient material having a side wall enclosing a bearing and provided with slots registering with said bracket grooves, and said shield having a dome-shaped end wall spaced from the end of said bearing.

CHARLES N. BEBINGER.